Dec. 14, 1965 J. B. CHATTEN 3,223,973
CHARACTER RECOGNITION SYSTEM EMPLOYING CHARACTER SIZE
DETERMINATION APPARATUS FOR CONTROLLING SIZE
OF SCANNING RASTER
Filed Jan. 15, 1962 6 Sheets-Sheet 1

INVENTOR.
JOHN B. CHATTEN
BY
Robert D. Sanborn
ATTORNEY

INVENTOR.
JOHN B. CHATTEN
BY
Robert D. Sanborn
ATTORNEY

| AND GATE / INPUTS | | | | |
|---|---|---|---|---|
| 84a | -t+u ↓ | a | -b | n |
| 84b | | b | -c | n |
| 84c | | c | -d | o |
| 84d | | d | -e | o |
| 84e | | e | -f | p |
| 84f | | f | -g | p |
| 84g | | g | -h | q |
| 84h | | h | -i | q |
| 84i | | i | -d | r |
| 84j | | j | -k | r |
| 84k | | k | -l | s |
| 84l | ↓ | l | -m | s |

| | | | | | | | | | | | | |
|---|---|---|---|---|---|---|---|---|---|---|---|---|
| a | 15 | 37 | 59 | 81 | 103 | | | | | | | |
| b | 14 | 36 | 58 | 80 | 102 | | | | | | | |
| c | 13 | 35 | 57 | 79 | 101 | 123 | | | | | | |
| d | 12 | 34 | 56 | 78 | 100 | 122 | | | | | | |
| | | | | | | | | | | | | |
| n | 124 | 125 | 126 | 127 | 128 | | | | | | | |
| o | 144 | 145 | 146 | 147 | 148 | 149 | 150 | | | | | |
| | | | | | | | | | | | | |
| t | 20 | 42 | 64 | 86 | 108 | 130 | 152 | 174 | 196 | 218 | 240 | 262 |
| u | 19 | 41 | 63 | 85 | 107 | 129 | 151 | 173 | 195 | 217 | 239 | 261 |

INVENTOR.
JOHN B. CHATTEN
BY Robert D. Sanborn
ATTORNEY

INVENTOR.
JOHN B. CHATTEN
BY
Robert D. Sanborn
ATTORNEY

INVENTOR.
JOHN B. CHATTEN
BY
Robert D. Sanborn
ATTORNEY

INVENTOR.
JOHN B. CHATTEN
BY
Robert D. Sanborn
ATTORNEY

United States Patent Office 3,223,973

Patented Dec. 14, 1965

3,223,973

CHARACTER RECOGNITION SYSTEM EMPLOYING CHARACTER SIZE DETERMINATION APPARATUS FOR CONTROLLING SIZE OF SCANNING RASTER

John B. Chatten, Philadelphia, Pa., assignor to Philco Corporation, Philadelphia, Pa., a corporation of Delaware Filed Jan. 15, 1962, Ser. No. 166,065
17 Claims. (Cl. 340—146.3)

The present invention relates to pattern recognition systems and more particularly to means for controlling the amplitude of the character scan of a correlation-mask recognition system.

Systems are known for scanning characters to obtain a signal having an amplitude versus time variation which is representative of the shape of the scanned character. For example, the character may be recorded in magnetic ink on a non-magnetic background and/or the character may be recorded in a color or shade that contrasts with the background. The area containing the character is scanned optically or with appropriate magnetic or optical sensing means to generate a signal representative of the character. Since the novelty of the present invention does not reside in the character scanning means per se, it will be assumed in the following description that the characters are recorded in black on a white background. However, it is to be understood that the invention is not to be limited to this form of character recording or to the specific scanning system which is shown by way of illustration.

In the presently preferred forms of pattern recognition systems to which the present invention relates, a signal derived from scanning the character is converted to a series of pulses which have one value if the area scanned during a given time increment includes any portion of the character, i.e. any "black" area, and a different value if the area scanned does not contain any portion of the character. A stepping shift register, a delay line or similar circuit is employed to store the series of pulses and supply selected ones of these pulses in different combinations to the several inputs of a plurality of weighted resistor-adder networks. These resistor-adder networks are known in the character recognition art as resistor-correlation masks. The polarity of the signal supplied to the masks and the values of the resistors making up the masks are so selected that the output signal of each adder network or mask has a maximum of one polarity when the area scanned includes the character associated with that mask.

In order for the systems of this type to operate effectively it is essential that the size of the scanning raster bear a predetermined relationship to the size of the character scanned.

It is an object of the present invention to provide novel means for determining the relative sizes of a scanning raster and the character scanned by that raster.

It is a further object of the present invention to provide means for maintaining a predetermined relationship between the size of a character and the size of a scanning raster.

In general, these and other objects of the invention are achieved by scanning a character with a raster of arbitrary size to obtain a signal which is characteristic of the scanned character. The generated signal is supplied to a height sensing circuit which is constructed so as to produce an output signal which is uniquely representative of the ratio of the height of the character scanned to the height of the raster. Means are provided for controlling the size of the scanning raster in response to the output signal of the height sensing circuit. For a better understanding of the present invention, together with other and further objects thereof, reference should now be made to the following detailed description which is to be read in conjunction with the accompanying drawings in which FIG. 1 is a block diagram of a portion of a typical character recognition system embodying the present invention;

Figure 1:
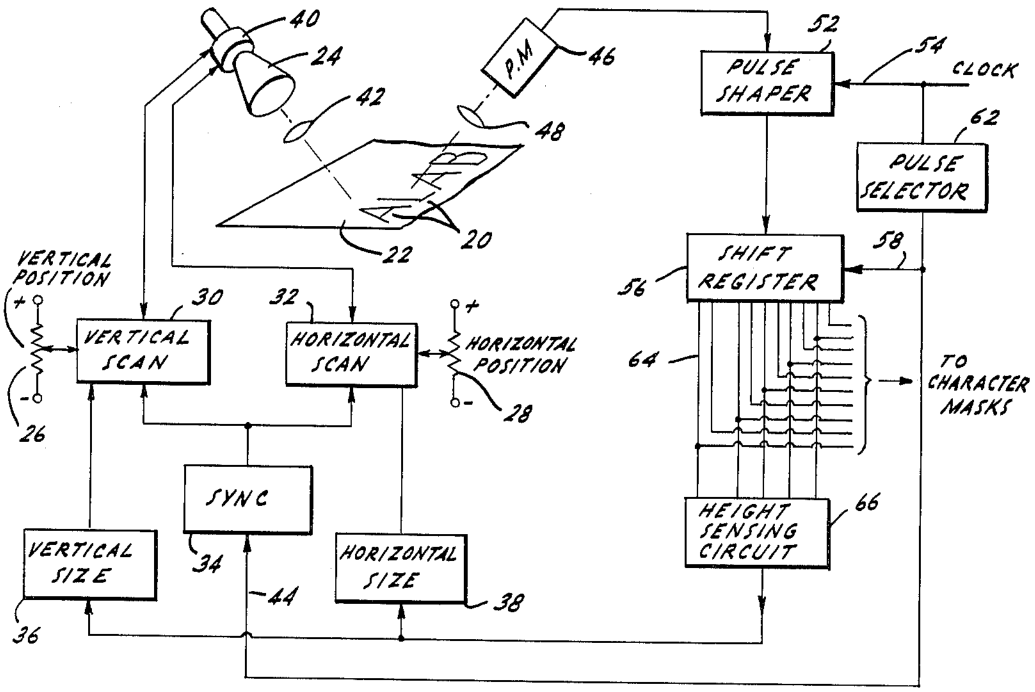

In the system shown in FIGURE 1 the characters to be recognized are non-reflective characters 20 appearing on a white or reflective sheet 22. Cathode ray tube 24 forms the output of a flying spot scanner system which also includes the vertical position control 26, horizontal position control 28, vertical scan generator 30, horizontal scan generator 32, scan synchronizing means 34, vertical size control 36 and horizontal size control 38. The output signals of vertical scan generator 30 and horizontal scan generator 32 are supplied to the deflection yoke 40 of cathode ray tube 24. A lens 42 is provided for focusing the spot generated by cathode ray tube 24 on sheet 22. As will be explained in more detail presently, the flying spot scanning system just described scans an area on sheet 22 with a rectangular raster, the size of the raster on sheet 22 being larger than one of the characters 20. The area scanned by the raster may be selected by adjusting vertical position control 26 and horizontal position control 28 to cause the raster to coincide with any selected character on sheet 22. The scanning of the raster is controlled by pulses supplied at input 44 to synchronizing circuit 34.

The area of the sheet 22 illuminated by the raster supplied by tube 24 is imaged on the photosensitive surface of photomultiplier tube 46 by means of a lens 48. The entire sheet 22 may be imaged on the photosensitive surface of photomultiplier tube 46, however it is only the area scanned by the raster that is sufficiently illuminated to provide an appreciable response from photomultiplier tube 46. The output of photomultiplier 46 is supplied to a pulse shaper 52 which receives a second input from a clock pulse source represented by the arrow 54. These clock pulses may be regularly spaced rectangular pulses having a duty cycle of the order of .25. Pulse shaper 52 may be any circuit which will convert the time varying signal supplied by photomultiplier tube 46 into a pulse signal having one amplitude if the area scanned during one clock pulse interval is entirely white and a different value if the area scanned includes a portion of the character which is scanned. One of the two values may be zero.

The output of pulse shaper circuit 52 is supplied to the input of shift register 56. Shift register 56 may be a conventional serial-type shift register in which the data in the register is shifted one place for each pulse received at input 58.

Figure 8:
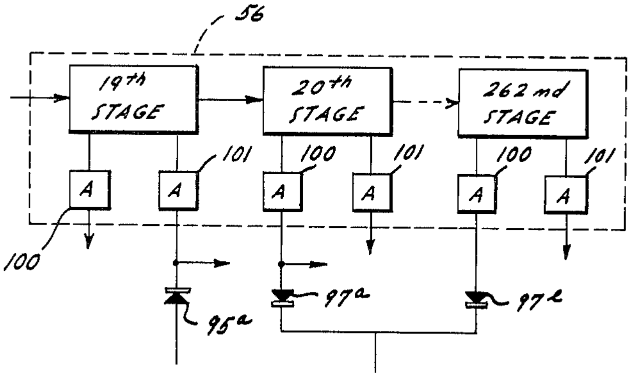
FIG. 8 is a detailed showing of a portion of shift register circuit 56 and the circuits associated therewith.

The output connections of shift register 56 are shown at 64 in FIG. 1. Preferably each stage of shift register 56 is provided with two complementary output connections as shown in FIG. 8. The "white" output of a stage is at some standard potential, for example —6 volts, and the "black" output of that stage is at ground potential is no character information is currently stored in that stage. When character information is present in the stage, the "white" output is at ground potential and the "black" output is at —6 volts. It will be recognized that the same result can be achieved by a single output connection and an inverter. A typical register may include 264 stages and hence 264 pairs of output connections 64.

Clock pulses from input 54 are supplied to input 58 and synchronizing circuit 34 by way of a pulse selector circuit 62. Pulse selector circuit 62 may be a counter circuit which cyclically passes the first $n$ pulses of a group of $m$ pulses and then blocks the remaining $m-n$ pulses. For example, pulse selector circuit 62 may pass the first 22 pulses of each group of 24 clock pulses supplied by input 54 and then block the remaining two pulses of the group. As will be explained in more detail presently, the time interval represented by the two blocked clock pulses allowed as flyback time for the flying spot scanner. The outputs 64 of the shift register 56 are connected to character recognition masks (not shown) which may be of the type disclosed and claimed in the copending application of James S. Bryan and Charles F. Teacher, entitled "Identification System" Serial No. 166,082, Filed Jan. 15, 1962, now Patent No. 3,167,745. Individual stages of shift register 56 are connected to the input of height sensing circuit 66. Height sensing circuit 66 is shown in more detail in FIGURES 3 through 8. Height sensing circuit 66 is connected to horizontal size control 38 and vertical size control 36 to control and amplitude of the horizontal and vertical scan voltages supplied to cathode ray tube 24. Vertical size control 36 and vertical scan generator 30 are shown in more detail in FIG. 12. Horizontal size control 38 and horizontal scan generator 32 may be similar in construction to vertical scan generator 30 and vertical size control 36.

Figure 2:
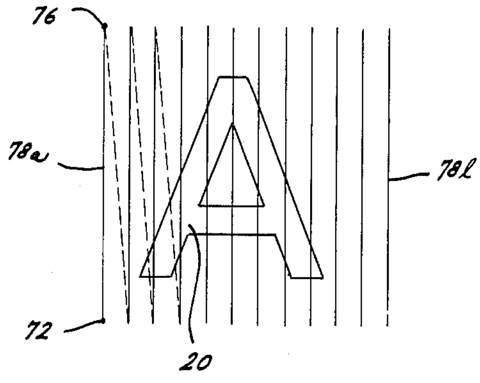
FIG. 2 is a plot showing a typical scanning pattern for the system of FIG. 1.

FIG. 2 illustrates the direction of the scan of a character 20 on sheet 22. The scan starts at the lower left-hand corner 72 of the sub-area containing a character 20 and proceeds in an upward direction in a predetermined number of steps to the point 76. The position of point 72 is selected by the proper adjustment of vertical position control 26 and horizontal position control 28. These controls are shown as manual controls in FIGURE 1, however it lies within the scope of the invention to provide means for automatically sensing the position of the character and adjusting the initial position of the sweep voltages. The size of the scan, that is, the spacing between the points 72 and 76, is varied by changing the size of the steps in the vertical sweep while maintaining a constant number of such steps. The number of steps employed will depend upon the desired resolution of the system. It has been found in practice that twelve scans with 22 steps per scan provide sufficient resolution for separating 52 alpha-numeric characters formed by standard typewriter type. The twelve scanning lines are identified in FIGURE 2 as scan lines 78A–78L. Preferably the horizontal scan for cathode ray tube 24 is also a step scan which advances one step during the flyback time of the vertical scan. However it is possible to employ a sawtooth scan for both the horizontal and vertical deflections of cathode ray tube 24.

Figure 3:
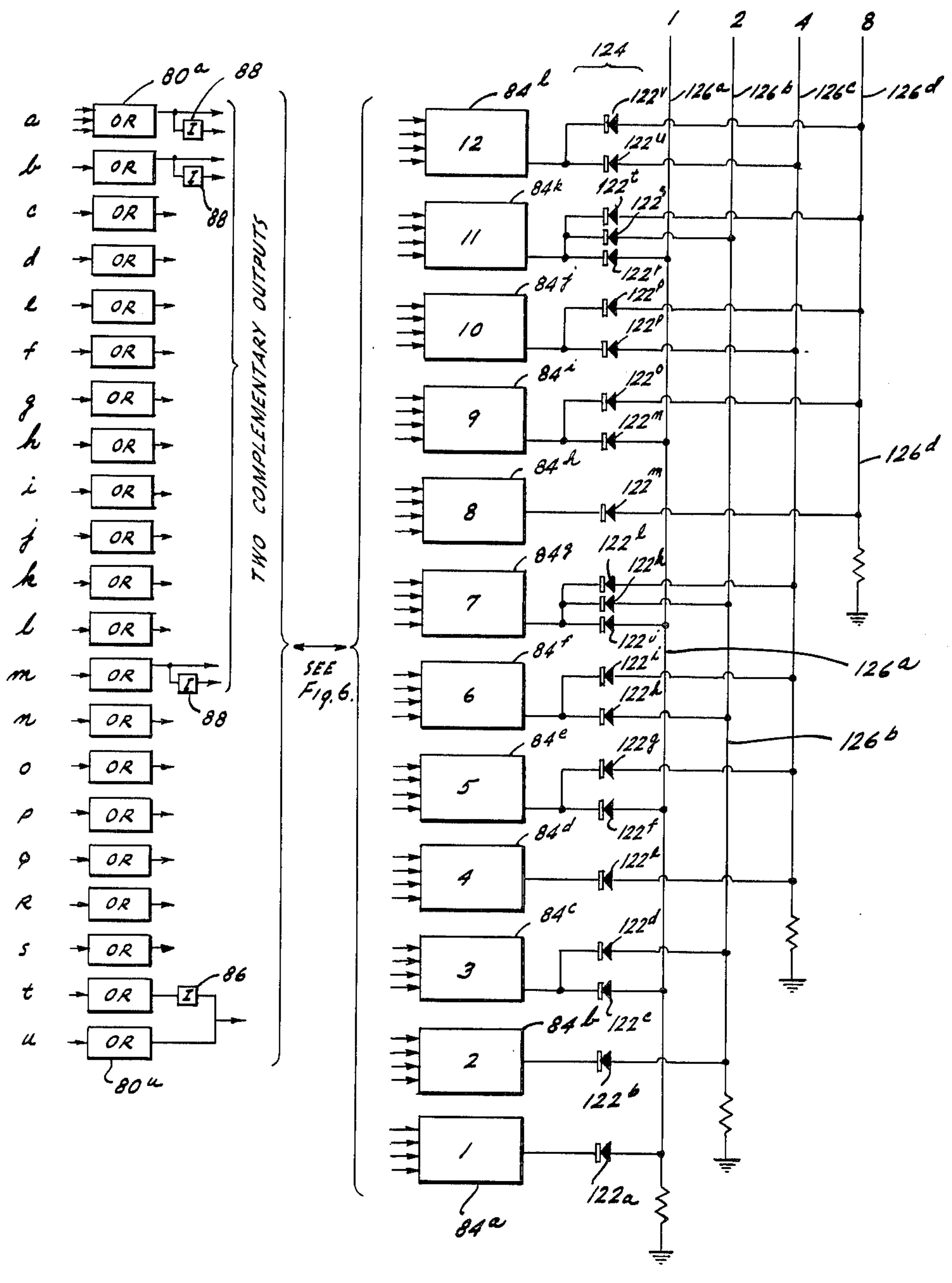
FIG. 3 is a block diagram of the character height sensing portion of the circuit of FIG. 1.

FIG. 3 is a detailed block diagram of the height sensing circuit 66 of FIGURE 1. As shown in FIGURE 3, height sensing circuit 66 includes 21 "or" gates which have been identified as "or" gates $80^a$ through $80^u$. Each of the "or" gates $80^a$–$80^u$ receives an input from a plurality of stages of shift register 56. The connections of the various stages of shift register 56 to "or" gates $80^a$–$80^u$ is shown diagrammatically in FIGURE 4.

Since the height sensing performed by the system of

Figures 4, 5, 6:
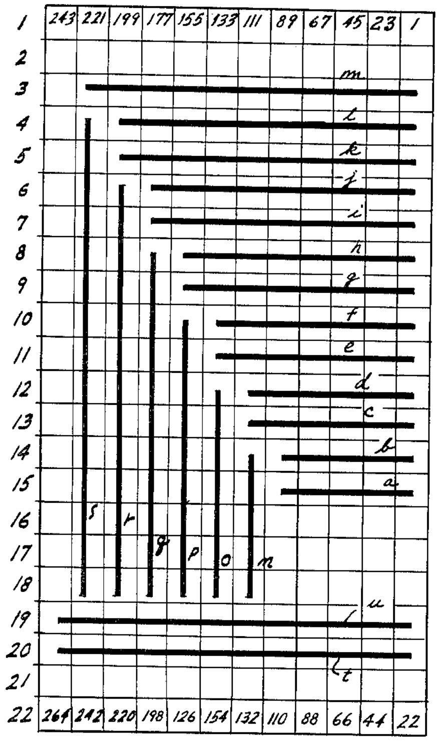
FIG. 4 is a diagram showing the connections between certain gate circuits of FIG. 3 and the shift register of FIG. 1.
FIG. 5 is a table which further defines the connections illustrated in FIG. 4.
FIG. 6 is a table which lists the connections between the various gate circuits of FIG. 3.

FIGURE 1 is entirely electrical in nature, the physical arrangement of the stages of the shift register 56 does not enter into the operation thereof. However in FIGURE 4 it is assumed that the stages of the shift register 56 are arranged in twelve columns of 22 stages in each column. For reasons which will become clear presently it is convenient to assume that the first stage of the shift register occupies the upper right-hand corner of the array, that the 23rd stage heads the second column from the right, etc. Therefore the 264th stage of the register will occupy the lower left-hand corner of the rectangular array of stages. Thus a signal injected into the first stage of the register will appear to proceed down the right-hand column of the array of stages until it reaches the bottom of this column and then jump to the top of the second column. Bar $a$ represents the individual stages which are coupled to "or" gates $80^a$ of FIGURE 3. As shown in FIG. 4 and the table of FIG. 5, the 15th, 37th, 59th, 81st and 103rd stages of shift register 56 are connected to "or" circuit $80^a$. It is to be understood that the 15th shift stage does not supply a signal to any of the other stages in this group, nor does the connection of the 5 stages to "or" circuit $80^a$ affect the normal operation of register 56. In a similar manner the stages connected by bars $b$ through $u$ of FIG. 4 represent the stages connected to "or" circuits $80^b$–$80^u$ respectively. A partial tabulation of these connections is given in the table of FIG. 5. A similar tabulation for the remaining "or" gates may be readily compiled from the showing of FIG. 4.

The outputs of "or" gates $80^a$–$80^u$ are connected in various combinations to the inputs of 12 "and" gates $84^a$–$84^l$. As will be explained in more detail presently, the 12 "and" gates of FIG. 3 correspond to the 12 possible heights of the character scannned and not to the 12 vertical scans of the raster. In order to simplify FIG. 3, the connections from "or" circiuts $80^a$–$80^u$ to the inputs of "and" gates $84^a$–$84^l$ are shown in tabular form in FIGURE 6. Also a detailed wiring diagram of "or" gates $80^a$, $80^b$, $80^n$, $80^u$ and $80^t$, and gate $84^a$ and other circuit components associated therewith is shown in detail in FIGURE 7. The lower case letters in the four right-hand columns of the table of FIG. 6 represent the superscripts of the corresponding "or" gates $80^a$–$80^u$. As shown in the second column of FIG. 6 the output of "or" gate $80^u$ is connected to an input of each of the "and" gates $84^a$–$84^l$. Similarly the output of "or" gate $80^t$ is connected to the input of each of the "and" gates $84^a$–$84^l$ by way of an inverter 86. The first horizontal row in the table of FIGURE 6 indicates that "and" gate $84^a$ is connected directly to "or" gate $80^a$, to the "or" gate $80^b$ through an inverter 88, and directly to "or" gate $80^n$. The minus signs in the fourth column of FIG. 6 indicate that the "or" gates represented by the letters in the fourth column are coupled to the respective "and" gates identified in the first column through an inverter circuit.

Figure 7:
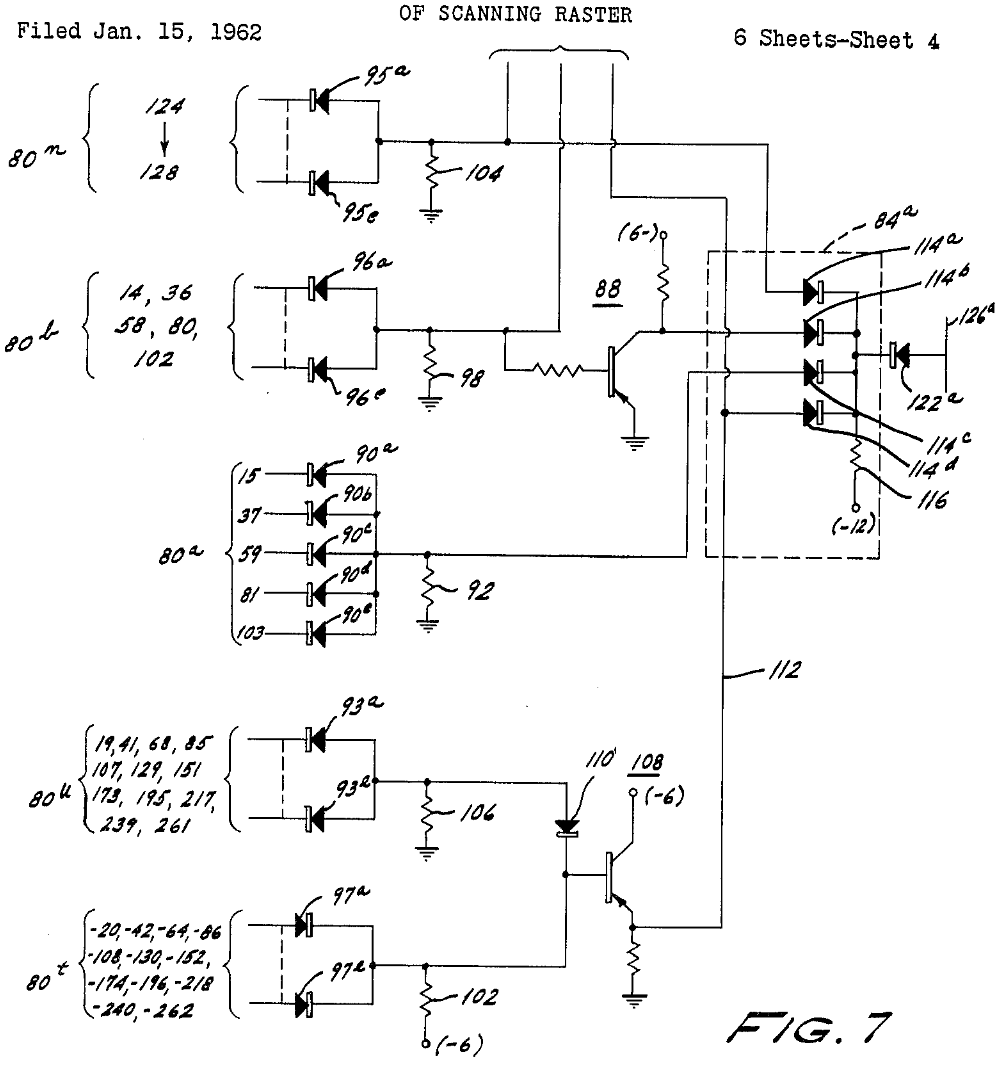
FIG. 7 is a detailed diagram of a portion of the circuit shown in block form in FIG. 3.

As shown in FIG. 7 "or" gate $80^a$ comprises five diodes $90^a$–$90^e$ the anode terminals of which are connected to ground through a common resistor 92. The cathodes of diodes $90^a$–$90^e$ are connected to the "black" output of the 15th, 37th, 59th, 81st and 103rd stages of shift register 56. "And" gate $80^b$ comprises five diodes $96^a$–$96^e$ and a common resistor 98. Only diodes $96^a$ and $96^e$ are shown in FIG. 7 in order to simplify the drawing. "Or" gates $80^c$–$80^s$ and $80^u$ may be identical to "or" gates $80^a$ and $80^b$ just described except for the number of diodes making up the respective "or" gates. In the following description the common resistors of "or" gates $80^n$ and $80^u$ are identified as resistors 104 and 106 respectively. The diodes of gates $80^u$ are identified as diodes $93^a$–$93^l$ and the diodes of gates $80^n$ are identified as diodes $95^a$–$95^e$.

"Or" gate $80^t$ may be identical to the remaining "or" gates if desired, in which case the inverter 86 of FIGURE 3 is required. However the same result may be achieved without inverter 86 by arranging gate $80^t$ as shown in FIGURE 7. Gate $80^t$ of FIG. 7 differs from the remaining "or" gates in three respects. The diodes $97^a$–$97^l$ are reversed, the diodes $97^a$–$97^l$ are connected to the "white" outputs of the respective stages of the shift register, and the common resistor 102 is returned to a point of negative potential. The reasons for these differences will appear presently.

FIG. 8 shows three typical stages of shift register 56 and the diode connections thereto. The blocks 100 and 101 in FIG. 8 are buffer amplifier stages which provide isolation between the flip-flop stages of the shift register and the "or" gates $80^a$–$80^t$.

Turning again to FIG. 7, the output of gate $80^t$ is connected directly to the input of emitter follower stages 108. The ungrounded terminal of resistor 106 is connected to the input of the emitter follower 108 by way of diode 110. Thus the signal appearing on bus 112 is representative of $(-t+u)$.

"And" gate $84^a$ comprises four diodes $114^a$–$114^d$ which have a common cathode resistor 116. Resistor 116 is returned to a point more negative than the bias supply for resistor 102. Bus 112 is connected to the anode of diode $114^d$. The ungrounded terminals of resistors 104 and 92 are connected to the anodes of diodes $114^a$ and $114^c$ respectively. The ungrounded terminal of resistor 98 is connected to the anode of diode $114^b$ by way of inverter 88.

Diode $122^a$ of FIGURE 7 comprises one diode in the diode encoding matrix 124 of FIGURE 3. The diodes $122^a$–$122^v$ of matrix 124 connects four output leads $126^a$–$126^d$ to the "and" gates $84^a$–$84^l$. The connections are such that leads $126^a$–$126^d$ are energized in a binary code to represent which one, if any, of the twelve "and" gates $84^a$–$84^l$ is providing an output signal.

As explained in detail in the above-mentioned copending application, pulse shaper 52 supplies to shift register 56 a pulse train which is generated in response to the scanning of the selected character 20. That is, a pulse will be generated for each scan interval in which the beam of the flying spot scanner illuminates a portion of the character 20. This pulse train is shifted through the register 56 in response to shift pulses supplied at input 58. If no pulse is being stored in a given stage the "white" output of the stage will be at some preselected potential, for example minus 6 volts and the "black" of the stage will be at ground potential. Therefore, the circuit of FIG. 7 operates in the following manner. If the cathodes of all of the diodes $95^a$–$95^e$ are at ground potential then there will be no drop across resistor 104. However if a stage of shift register 56 causes the cathode of any one of the diodes $95^a$–$95^e$ to assume a potential of minus 6 volts, that diode will conduct and cause the ungrounded terminal of resistor 104 to be at approximately minus 6 volts. "Or" gates $80^n$, $80^b$ and $80^u$ operate in a similar fashion.

If none of the diodes $96^a$–$96^e$ is conducting the transistor in inverter stage 88 will be cut off and the output of inverter stage 88 will be at minus 6 volts. However, if any one of the diodes $96^a$–$96^e$ is conducting the output of inverter stage 88 will be substantially at ground potential. In gate $80^t$ the anodes of diodes $97^a$–$97^l$ are normally at minus 6 volts if no character information is stored in the corresponding stages of shift register 56. Under these conditions both terminals of resistor 102 will be at minus 6 volts. However if the anode of any one of the diodes $97^a$ is at ground potential, the upper terminal of resistor 102 will also be at ground potential. Resistor 102 has a resistance large compared to the resistance of resistor 106. Therefore if the output of either gate $80^u$ or $80^t$ is at ground potential the input and hence the output of emitter follower stage 108 will be at substantially ground potential. However if the outputs of both gates $80^u$ and $80^t$ are at minus 6 volts the output of emitter follower stage 88 will be at minus 6 volts.

Turning now to "and" gate $84^a$, resistor 116 may have a resistance comparable to that of resistance 102. If the anodes of all the diodes $114^a$–$114^d$ are at minus 6 volts, the common cathode connection of these diodes will be at minus 6 volts. However if the anode of any one of the diodes $114^a$–$114^d$ is at ground potential the common cathode connection will also be at substantially ground potential.

If the common cathode connection of diodes $114^a$–$114^d$ is at minus 6 volts then diode $122^a$ will conduct and place output lead $126^a$ at minus 6 volts. If the common cathode connection of diodes $114^a$–$114^d$ is at ground potential, output lead $126^a$ will normally be at ground potential but may be held at minus 6 volts by any one of the "and" gates $84^c$, $84^e$, $84^f$, $84^g$, $84^i$, and $84^k$ to which lead $126^a$ is also connected.

The operation of height sensing circuit 66 will now be explained with reference to FIGURES 9, 10 and 11. As explained in detail in the above-mentioned copending application the pulse train generated as the beam of the flying spot scanner passes over the character 20 in accordance with the raster of FIGURE 2 is supplied to the first stage of the shift register 56. The pulses are then shifted through the register stage by stage in response to shift pulses supplied at input 58.

Figure 9:
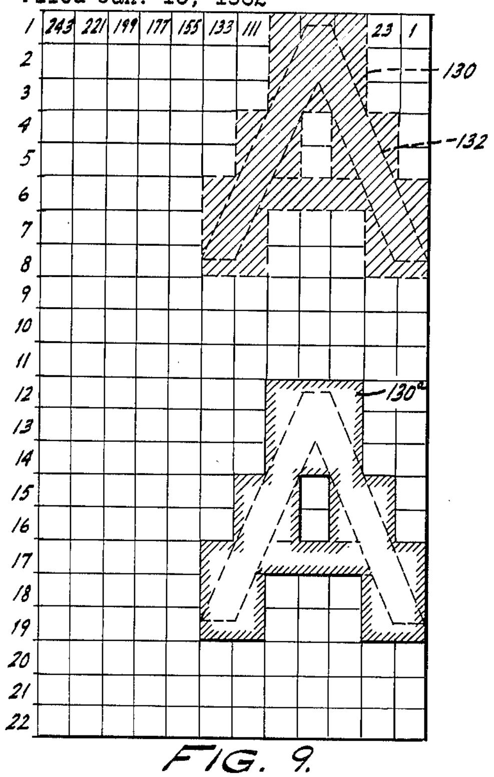
FIGS. 9, 10 and 11 are diagrams which are illustrative of the operation of the present invention.

After approximately 190 scan steps the pattern of stages storing character data will be as represented by the shaded area 130 in FIGURE 9. The relationship of this data to the original character 20 is illustrated by the superimposed letter A shown at 132 in FIGURE 9. The pattern of conducting stages shown at 130 will advance one stage of the shift register 56 for each shift pulse supplied to input 58. In FIGURE 9 this is represented by a one line downward shift of the entire pattern 130. Thus in response to eleven successive shift pulses the pattern 130 will occupy the position shown at $130^a$.

Figure 10:
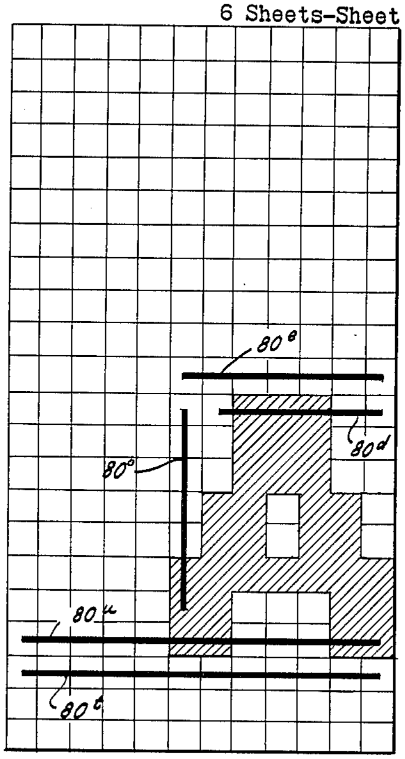

FIGURE 10 illustrates the relationship of the energized stages with respect to "or" gates $80^d$, $80^e$, $80^o$, $80^u$ and $80^t$.

It will be seen that all of the stages to which gates $80^t$ and $80^e$ are connected are in the "white" or background state. Also at least one stage connected to each of the "or" gates $84^d$, $80^o$ and $80^u$ is set to the "black" state. Turning to the table of FIGURE 6 it will be seen that this will cause "and" gate $84^d$ to provide an output signal. Since the pattern must move down to the position such that at least one stage connected to "or" gate $80^u$ is storing character information but no stage connected to gate $80^t$ is storing character information, "or" gates $80^d$ and $80^e$ form the only pair of "or" gates in the group $80^a$–$80^m$ which satisfy the condition that at least one stage connected to a lower "or" gate is storing character information while no stage connected to the upper "or" gate is storing character information. "Or" gates $80^n$–$80^s$ insure that the pattern of pulses representing a character is far enough into the register so that the tallest part of the character will not be missed. The function of gates $80^n$–$80^s$ is illustrated in FIGURE 11. In FIGURE 11 it is assumed that the raster is somewhat smaller compared to the letters than in the example shown in FIGURES 9 and 10. Therefore the signals representing the letters will occupy a greater span of stages in the register 56.

Figure 11:
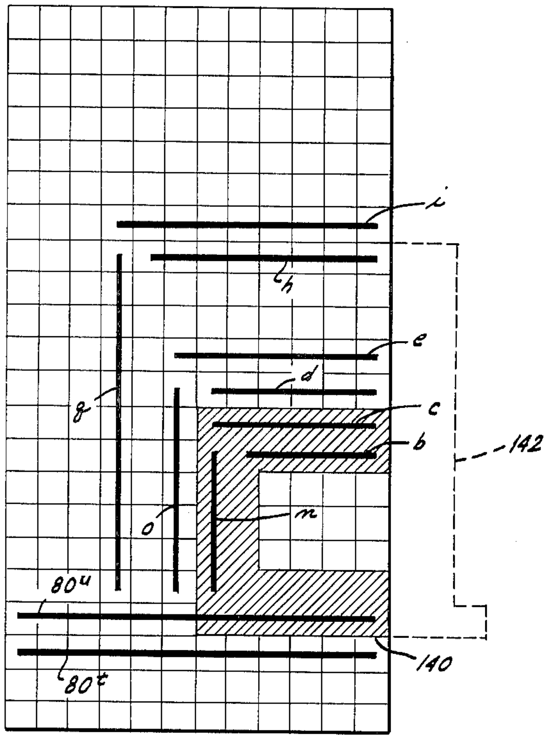

The shaded area 140 in FIGURE 11 illustratates the portion of the pulse train representative of a lower case *d* which has been supplied to register 56. The additional pulse information that will be generated in response to the complete scanning of the lower case *d* is represented by the broken line 142. It will be seen that the portion of the information already present in the register satisfies the condition that "or" gate $80^d$ is connected to only inactive stages while "or" gate $80^c$ is connected to at least one active stage and a further condition that "or" gate $80^u$ is connected to at least one active stage while "or" gate $80^t$ is connected to only inactive stages. Turning to the table of FIGURE 6 it will be seen that this satisfies four of the five conditions necessary to provide an output from "and" gate 84^c. However the fifth condition is that "or" gate 80^o must be connected to at least one active stage. This condition is not met therefore "and" gate 84^c does not provide an output signal. Similarly "and" gate 84^b is prevented from generating a signal by reason of the fact that there is at least one active stage connected to "or" gate 80^c. After 22 more shift pulses the character *d* will be shifted one column to the left as shown in FIGURE 11. This will provide the necessary output from "or" gate 80^o, however "or" gate 80^d will now be connected to at least one active stage and hence "and" gate 84^c will still not provide an output. After 66 shift pulses from the position shown in FIGURE 11 the pattern shown will be displaced three columns to the left and the condition will be satisfied that "and" gates 80^t and 80^l are connected to inactive stages while "or" gates 80^u, 80^q and 80^h are connected to at least one active stage each. It will be seen from the table of FIGURE 6 that all of the conditions necessary for "and" gate 84^h to produce an output signal are satisfied. Turning to FIGURE 3 it will be seen that an output signal from "and" gate 84^h will energize output lead 126^d.

Figure 12:
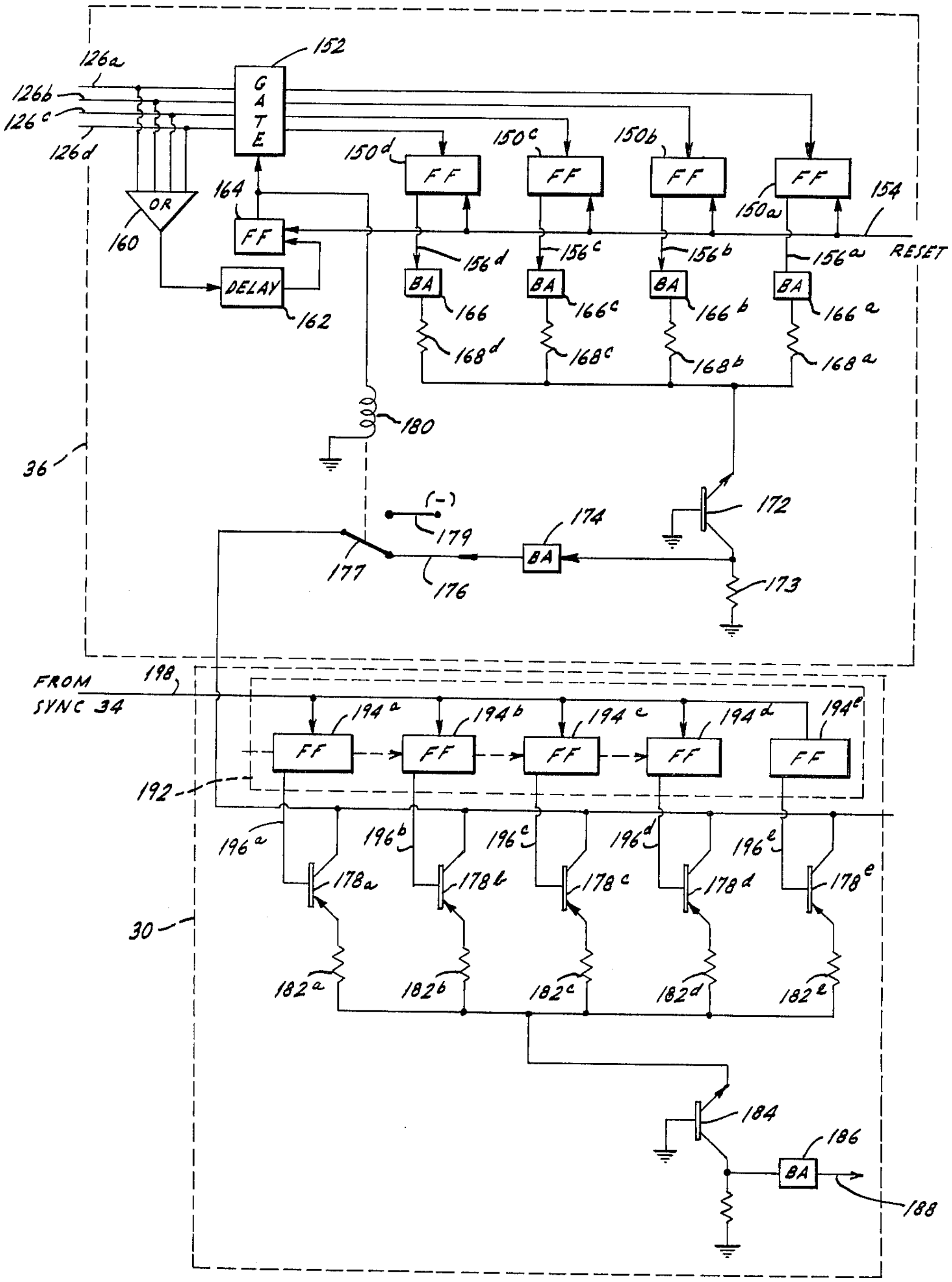
FIG. 12 is a detailed diagram of the vertical sweep generator circuit and size control circuit therefor.

FIGURE 12 is a detailed block diagram of vertical size control 36 and vertical scan generator 30. Leads 126^a–126^d in FIGURE 12 correspond to the similarly numbered leads in FIGURE 3. These four leads are connected through a four channel inhibit gate 152 to four storage flip-flops 150^a–150^d by way of connection 154.

Flip-flops 150^a–150^d are so constructed that each of the outputs 156^a–156^d are at ground potential when flip-flops 150^a–150^d are in the reset condition and at a selected negative potential when the respective flip-flop is changed to a "set" condition by a signal on the corresponding leads 126^a–126^d.

"Or" gate 160 connects to the four leads 126^a–126^d and provides an output signal to delay circuit 162 if one or more of these leads is energized. Delay circuit 162 supplies an actuating signal to flip-flop 164. Flip-flop 164 is connected to gate 152 to control the operation of this gate.

Outputs 156^a–156^d are connected by way of buffer amplifiers 166^a–166^d and weighting resistors 168^a–168^d, respectively, to the emitter of transistor 172. The base of transistor 172 is returned to ground. The collector of an NPN transistor 172 is connected to ground through resistor 173. The base-emitter diode of transistor 172 provides a low impedance to ground from the common junction of resistors 168^a–168^d. The current through resistor 173 is proportional to the sum of the currents through resistors 168^a–168^d. Buffer amplifier 174 provides a low impedance drive circuit for the circuits which follow. The output connection 176 of buffer amplifier 174 is connected by way of switch 177 to the collectors of five transistors 178^a–178^e. The terminal 179 of switch 177 is maintained at a preselected fixed potential. In FIGURE 12 it is assumed that switch 177 is controlled by coil 180 which is connected to the output of flip-flop 164. It is to be understood, however, that suitable transistor switching circuit may be substituted for the relay circuits 180–177 shown in FIGURE 12.

The emitters of transistors 178^a–178^e are connected by way of weighting resistors 182^a–182^e, respectively, to the emitter of an NPN transistor 184. Transistor 184 and buffer amplifier 186 have functions similar to transistor 172 and amplifier 174. The output connection 188 of buffer amplifier stage 186 provides the vertical deflection signal for cathode ray tube 24.

The bases of transistors 178^a–178^e are controlled by a binary counter chain 192 schematically represented by the five flip-flop circuits 194^a–194^e. Counter 192 may be any convenient form of counter chain which will energize output leads 196^a–196^e in patterns to indicate in binary form the number of pulses supplied by way of input 198 from the synchronizing circuit 34. As mentioned above, counter chain 192 preferably counts to 22 and then resets.

The circuit of FIGURE 12 operates in the following manner. A reset signal is supplied by way of input lead 154 to reset flip-flop circuits 150^a–150^d. This causes the output connections 156^a–156^d to be at ground potential. Flip-flop 164 is also reset which opens gate 152 for the passage of a signal in any of the four channels and connects terminal 179 to the collector of transistors 178^a–178^e by way of switch 177. Resistors 182^a–182^e are selected so that the emitter current of transistor 184 is in the ratio 1:2:4:8:16, respectively, if transistors 178^a–178^e are turned on one at a time in succession. Thus by energizing leads 196^a–196^e in accordance with a binary code the voltage at output connection 188 will advance in equal increments or steps. The energization of leads 196^a–196^e is accomplished by counter 192 in response to pulses applied at input 198. The signal at output 188 will thus generate a vertical step scan having an amplitude proportional to the amplitude of the potential at terminal 179. Horizontal size control 38 and horizontal scan generator 32 will operate in a similaar fashion to produce the necessary horizontal scan.

The signals supplied to height sensing circuit 66 by shift register 56 will cause one of "and" gates 84^a–84^l, for example gate 84^e, to provide an output signal. This will energize one or more of leads 126^a–126^d, in this example leads 126^a and 126^c. Energization of leads 126^a and 126^c will cause flip-flops 150^a and 150^c to be set so that output connection 156^a and 156^c are at a fixed negative voltage. Resistors 168^a, 168^b, 168^c and 168^d form a second digital-to-analog converter circuit and have resistance value such that the currents through these resistors are in the ratio of 1:2:4:8 when the respective output leads 156^a–156^d are energized. Thus the voltage at output 176 will be determined by the combination of flip-flops 150^a–150^d which are energized by leads 126^a–126^d. In the example given above, output lead 176 will be at an arbitrary level 5. This may be minus 5 volts, for example, or any convenient multiple, including fractional multiples, of minus 5 volts.

The signal on any one of the leads 126^a–126^d will cause "or" gate 160 to supply a signal to flip-flop 164 by way of delay circuit 162. The actuation of flip-flop 164 causes gate circuit 152 to break the connection between leads 126^a–126^d and flip-flops 150^a–150^d. Delay 162 permits flip-flops 150^a–150^d to be set by the signals present on leads 126^a–126^d before gate 152 is activated. Flip-flop 164 also causes switch 177 to connect output lead 176 to transistors 178^a–178^e in place of terminal 179. Therefore the emitter potential for transistors 178^a–178^e and hence the amplitude at the steps of output 188 is determined by the setting of flip-flops 150^a–150^d. Since a pattern of small amplitude on the mask of FIG. 4 will result in a relatively small output signal at the output connection 176, the relative size of the raster with respect to the character will be decreased. It can be shown that, regardless of the "and" gate 84^a–84^l which produces an output signal, the resulting sweep will be such that the height of the character scanned will be a predetermined fraction of the vertical dimension of the resulting raster.

Resetting of flip-flops 150^a–150^d and flip-flop 164 by way of connection 154 occurs only after a select group or number of characters have been recognized or it has been determined that the pattern scanned is not one that can be recognized.

Switch 177 can be eliminated if flip-flops 150^a–150^d are at a negative potential and the connections between "and" gates 84^a–84^l to leads 126^a to 126^d are made in inverse order, that is if gate 84^l is connected in the manner shown for gate 84^a, gate 84^k is connected in the manner shown for gate 84^b, etc. The initial height measurement will be made with the raster at maximum amplitude and one or more of the flip-flops 150^a–150^d will be set by signals on leads $126^a$–$126^d$ to reduce the amplitude of the voltage output 176 and hence the amplitude of the sweep voltage at output 188.

As a further alternative, the binary counter 192 may be replaced by a 24 stage recirculating shift register, the first 22 stages of which are connected to the bases of 22 transistors corresponding to transistors $178^a$–$178^e$. The emitter resistors for each stage in this alternative form of sweep circuit 30 has a value proportional to $$\frac{23-P}{22}$$

where P is the position number of the transistor in the series. In the arrangement just described a single stage of the shift register is set to provide an output signal. Clock pulses supplied directly from source 54 are supplied to the shift register to cause the 24 stages of the shift register to be active in succession. It will be seen that this circuit will produce the desired 22 step sweep followed by two clock intervals for beam retrace.

While the invention has been described with reference to the preferred embodiments thereof, it will be apparent that various modifications and other embodiments thereof will occur to those skilled in the art within the scope of my invention. Accordingly I desire the scope of my invention to be limited only by the appended claims.

I claim:

1. In a character recognition system, means for providing an indication of the size of a scanned character relative to the size of the area scanned comprising means having a plurality of output connections, scanning means for initially energizing selected ones of said output connections in a pattern representative of the spatial distribution of incremental areas of said area scanned, means for repeatedly altering the output connections which are energized to represent the respective ones of said incremental areas of said area scanned, and means coupled to said output connections for generating one of a selected plurality of signals as determined by the size of said character, each of said selected plurality of signals being representative of one of a plurality of preselected patterns of energization of said output connections, said preselected patterns being representative of a respective plurality of incremental boundaries within said area scanned, and means, responsive to said plurality of signals, for controlling the size of the area scanned by said scanning means.

2. In a character recognition system, means for providing an indication of the size of a scanned character relative to the size of the area scanned comprising means for scanning an area which includes a character to be recognized, said scanning means including means for generating time-spaced signals representative of the location in said scanning pattern of different areas of said character, circuit means providing a plurality of output connections, means coupled to said circuit means and said scanning means for energizing selected ones of said output connections to represent the time relationship of said time-spaced signals, means for repeatedly altering the output connections which are energized to represent the respective ones of said time-spaced signals, and means coupled to said output connections for generating one of a selected plurality of signals as determined by the size of said character, each of said selected plurality of signals being representative of one of a plurality of preselected patterns of energization of said output connections, said preselected patterns being representative of a respective plurality of incremental boundaries within said area scanned, and means, responsive to said plurality of signals, for controlling the size of the area scanned by said scanning means.

3. In a character recognition system, means for providing an indication of the size of a scanned character relative to the size of the area scanned comprising means for scanning an area which includes a character to be recognized, said scanning means including means for generating signals representative of the location in said scanning pattern of different areas of said character, signal delay means having a plurality of output connections, means coupling said scanning means to the input of said signal delay means, a plurality of coincidence circuit means each having a plurality of input connections, said input connections of said respective coincidence means being connected to different combinations of said output connections, and means, responsive to the outputs of said coincidence circuit means, for controlling the size of the area scanned by said means for scanning.

4. In a character recognition system means for providing an indication of the size of a scanned character relative to the size of the area scanned comprising means for scanning said area to generate sequential signals representative of the spatial location of various incremental areas within said area scanned, circuit means having an input connection and a plurality of output connections which are energized in sequence to represent at successive times a signal supplied to the input thereof, means for supplying said sequential signals to said input of said circuit means, means coupled to said output connection for generating one of a selected plurality of signals as determined by the size of said character, each of said selected plurality of signals being representative of one of a plurality of preselected patterns of energization of said output connections, said preselected patterns being representative of a respective plurality of incremental boundaries within said area scanned, and means, responsive to said plurality of signals, for controlling the size of the area scanned by said scanning means.

5. A character recognition system as in claim 4 wherein said means for generating one of a selected plurality of signals comprises a plurality of coincidence circuit means each having a plurality of input connections, said input connections of said respective coincidence means being connected to different combinations of the output connections.

6. In a character recognition system, means for providing an indication of the size of a scanned character relative to the size of the area scanned comprising means for scanning an area which includes a character to be recognized, means associated with said scanning means for generating time-spaced signals representative of the character scanned, a multistage shift register, means for setting said shift register to represent said time-spaced signals, means for repeatedly shifting the data stored in said shift register stage by stage, a plurality of sensing circuits connected to said shift register, each sensing circuit being adapted to sense the state of a selected plurality of stages of said shift register, coincidence circuit means responsive to the outputs of said plurality of sensing circuits, and means, responsive to the outputs of said coincidence circuit means, for controlling the size of the area scanned by said means for scanning.

7. In a character recognition system which includes means for scanning an area which includes a character to be recognized to generate time-spaced signals representative of the character scanned, a multistage shift register, means for setting said shift register to represent said time-spaced signals, and means for repeatedly shifting the data stored in said shift register stage by stage, means for providing an indication of the size of the character relative to the size of the area scanned comprising, a first plurality of gate circuits, each of said gate circuits of said first plurality being connected to a plurality of successive stages of said shift register, each gate circuit of said first plurality providing one output signal if any one of said stages to which it is connected is set to a selected state and a different output signal if none of the stages to which it is connected is set to said selected state, a second plurality of gate circuits, each of said gate circuits of said second plurality being connected to a plurality of spaced stages of said shift register, each of said gate circuits of said second plurality providing one output signal if any one of said stages to which it is connected is set to a selected state and a different output signal if none of the stages to which it is connected is set to said selected state, and a third plurality of gate circuits, each of said gate circuits of said third plurality being coupled to a single one of said gate circuits of said first plurality and more than one of said gate circuits of said second plurality, each of said gate circuits of said third plurality providing a first output signal if all of said gate circuits to which it is connected are providing preselected output signals and a different output signal if any one of said gate circuits to which it is connected is providing other than the preselected output signal.

8. In a character recognition system which includes means for scanning an area which includes a character to be recognized to generate a train of signals representative of the character scanned, signal delay means having an input and a plurality of outputs which are energized in succession to represent a signal supplied to said input thereof, means for supplying said train of signals to said input of said signal delay means, a first plurality of "or" gate circuits, each of said gate circuits of said first plurality being connected to a plurality of successive outputs of said signal delay means, a second plurality of "or" gate circuits, each gate circuit of said second plurality being connected to a plurality of spaced outputs of said signal delay means, and a third plurality of "and" gate circuits, each of said gate circuits of said third plurality being coupled to a single one of said gate circuits of said first plurality and more than one gate circuit of said second plurality, and means, responsive to the outputs of said "and" gate circuits, for controlling the size of the area scanned by said means for scanning.

9. A system in accordance with claim 8 wherein said signal delay means comprises a multistage shift register.

10. In a character recognition system which includes means for scanning in a rectangular raster comprising N sweeps of M timed intervals each an area which includes a character, wherein N and M are integers greater than one, means associated with said scanning means for generating a train of signals representative of the character scanned, said train including a first signal for each interval in which the scan coincides with the character to be recognized, a multistage shift register, each stage of said shift register being adapted to be set to register character information, means for setting said shift register to represent said train of signals, and means for repeatedly shifting stage by stage the data stored in said shift register, means for providing an indication of the size of the character relative to the size of the area scanned comprising a first plurality of gate circuits, each of said gate circuits of said first plurality being connected to a plurality of successive stages of said shift register, each of said gate circuits of said first plurality providing one output signal if any one of said stages to which it is connected is set to a selected state and a different output signal if none of the stages to which it is connected is set to said selected state, a second plurality of gate circuits, each of said gate circuits of said second plurality being connected to a plurality of spaced stages of said shift register, each of said gate circuits of said second plurality providing one output signal if any one of said stages to which it is connected is set to a selected state and a different signal if none of the stages to which it is connected is set to said selected state, and a third plurality of gate circuits, each of said gate circuits of said third plurality being coupled to a single one of said gate circuits of said first plurality and more than one of said gate circuits of said second plurality, each of said gate circuits of said third plurality providing a first output signal if all of said gate circuits to which it is connected are providing preselected output signals and a different output signal if any one of said gate circuits to which it is connected is providing other than the preselected output signal.

11. A system in accordance with claim 10 wherein the stages connected to any one gate circuit of said second plurality of gate circuits are spaced apart by M stages.

12. A system in accordance with claim 11 wherein succesive stages of said shift register are connected to successive ones of said second plurality of gate circuits.

13. In a character recognition system which includes means for scanning in a rectangular raster of N sweeps of M time intervals each an area which includes a character to be recognized, where M and N are integers greater than one, means associated with said scanning means for generating a train of signals representative of the character scanned, said train including a first signal for each interval in which the scan coincides with the character to be recognized, a multistage shift register, means for setting said shift register to represent said train of signals, and means for repeatedly shifting stage by stage the data stored in said shift register, means for providing an indication of the size of the character relative to the size of the raster comprising, a first plurality of gate circuits, each of said gate circuits of said first plurality being connected to a plurality of successive stages of said shift register, a second plurality of gate circuits, each of said gate circuits of said second plurality being connected to a plurality of spaced stages of said shift register, a pair of gate circuits, each gate circuit of said pair being connected to a plurality of spaced stages, said stages connected to any one of said gate circuits of said second plurality and said pair being M stages apart, the stages connected to said first gate circuit of said pair being adjacent the stages connected to said second gate circuit of said pair, the stages connected to said second plurality of gate circuits comprising groups of successive stages, the largest of said last mentioned group including a stage connected to each of said second plurality of gate circuits, and a third plurality of gate circuits, each gate circuit of said third plurality being connected to a single one of said gate circuits of said first plurality, to both gate circuits of said pair, and to two gate circuits of said second plurality, the stages connected to one of said last mentioned two gate circuits being adjacent the stages connected to the other of said last mentioned group of two gate circuits.

14. A system in accordance with claim 13, wherein each of said stages of said shift register which is connected to a gate circuit is connected to but a single one of said gate circuits.

15. In a character recognition system, means for providing an indication of the size of a scanned character relative to the size of the area scanned comprising means having a plurality of output connections, scanning means for initially energizing selected ones of said output connections in a pattern representative of spatial distribution of incremental areas of said area scanned, means for repeatedly altering the output connections which are energized to represent the respective ones of said incremental areas of said area scanned, a plurality of means coupled to said output connections, each of said means being coupled to such of said output connections as represent a line of incremental areas on the area scanned, each of said plurality of means being arranged to provide an output signal if one of the output connections coupled thereto is energized, additional means coupled to selected ones of said plurality of means for providing a selected plurality of signals representative, respectively, of a preselected combination of output signals from said plurality of means, and means, responsive to said plurality of signals, for controlling the size of the area scanned by said scanning means.

16. A character recognition system in accordance with claim 15 wherein each of said plurality of means is connected to such of said output connections as represent straight lines of incremental areas of the character being scanned.

17. A character recognition system in accordance with claim 16 wherein certain of said lines of incremental areas are disposed at right angles to others of said lines of incremental areas.

References Cited by the Examiner

UNITED STATES PATENTS 3,017,625 1/1962 Evans et al.

FOREIGN PATENTS 850,581 10/1960 Great Britain.

OTHER REFERENCES

"Reading by Electronics," published in Wireless World, pages 173–175, April 1957.

MALCOLM A. MORRISON, *Primary Examiner*.